No. 753,070. PATENTED FEB. 23, 1904.
D. H. HAYWOOD.
APPARATUS FOR MAKING HAIR PINS.
APPLICATION FILED APR. 23, 1903.
NO MODEL. 4 SHEETS—SHEET 1.
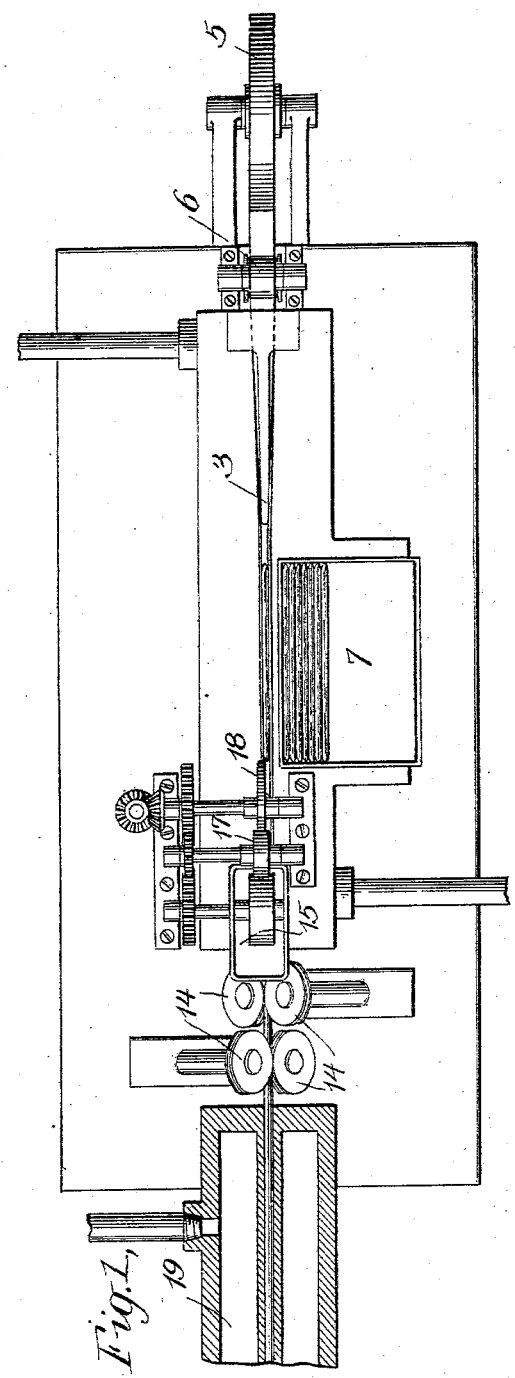
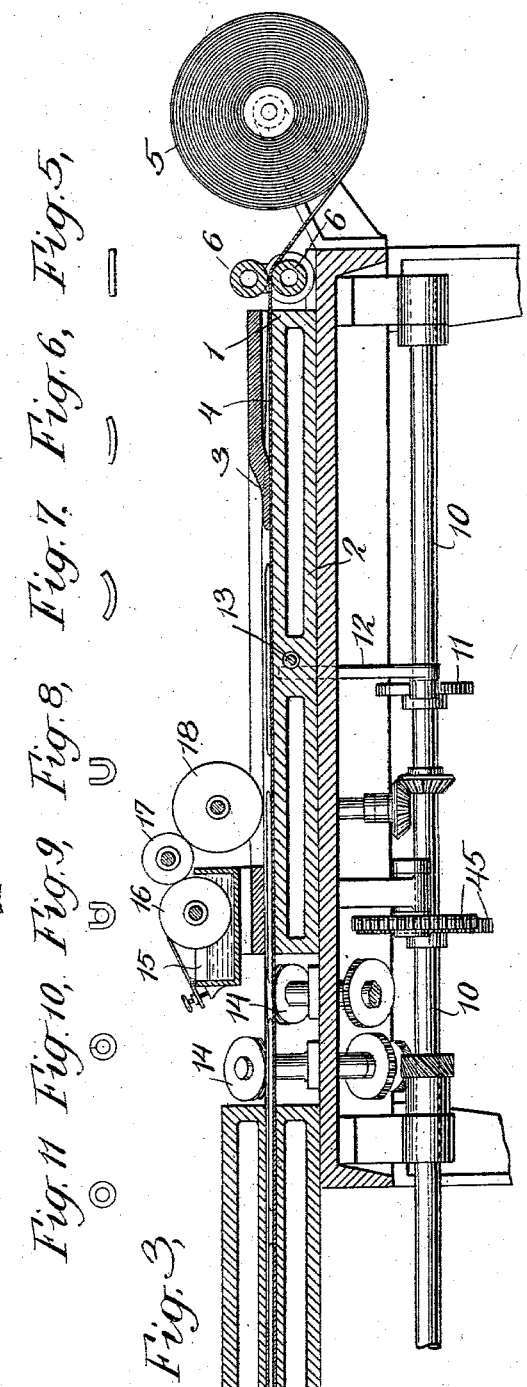

No. 753,070. PATENTED FEB. 23, 1904.
D. H. HAYWOOD.
APPARATUS FOR MAKING HAIR PINS.
APPLICATION FILED APR. 23, 1903.
NO MODEL. 4 SHEETS—SHEET 2.
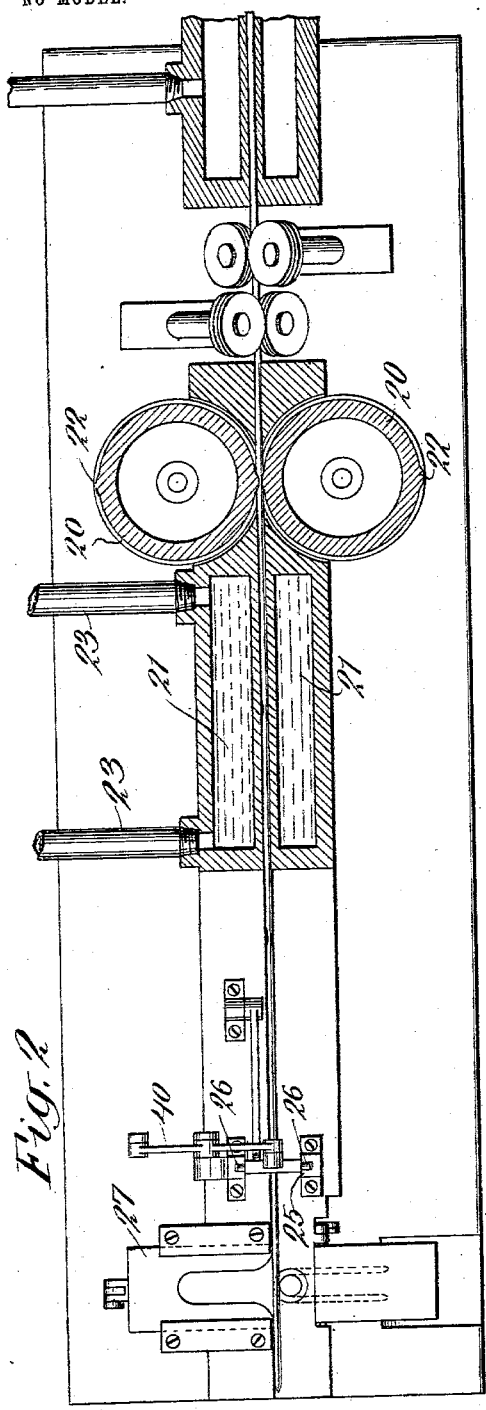
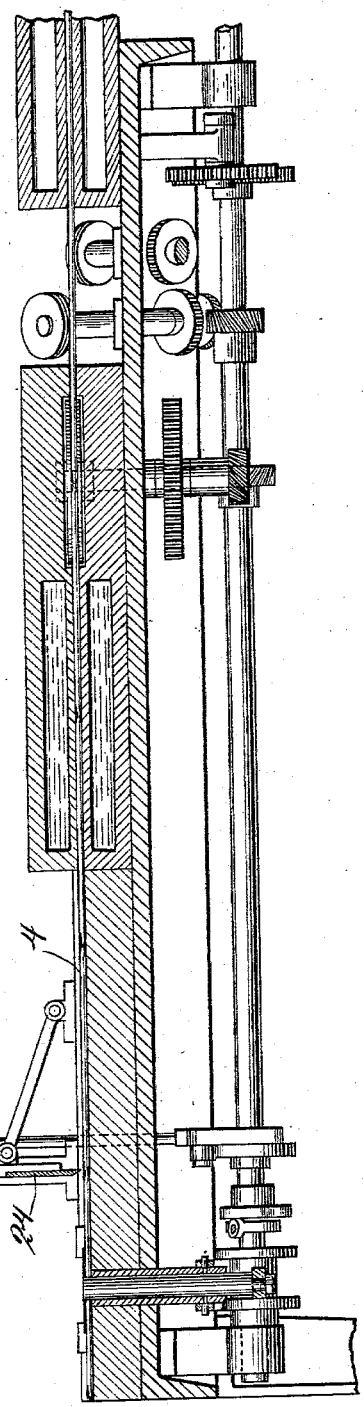

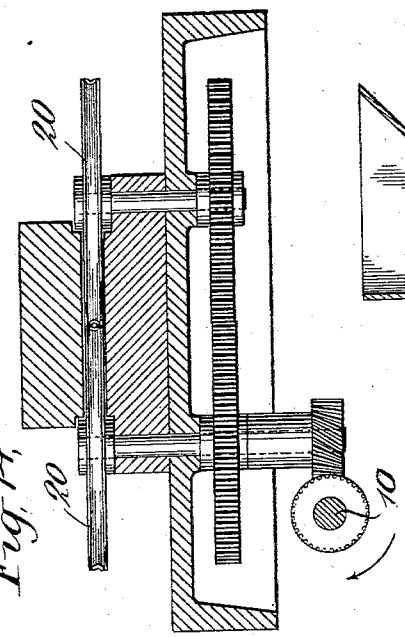
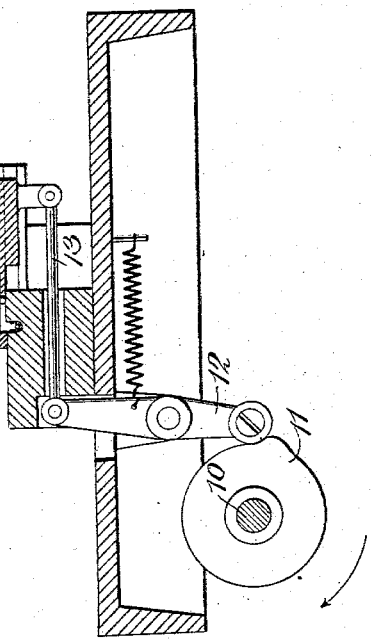
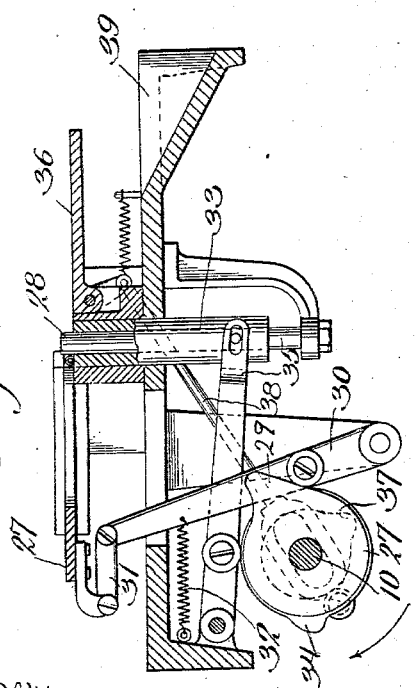
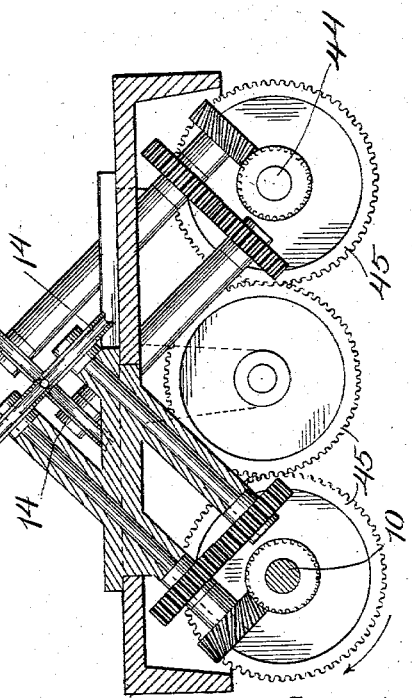

No. 753,070. PATENTED FEB. 23, 1904.
D. H. HAYWOOD.
APPARATUS FOR MAKING HAIR PINS.
APPLICATION FILED APR. 23, 1903.
NO MODEL. 4 SHEETS—SHEET 4.
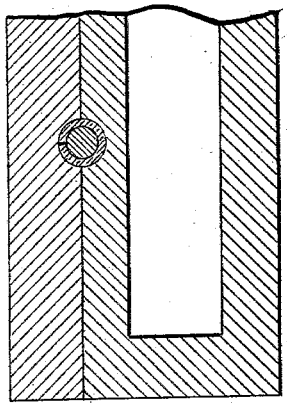
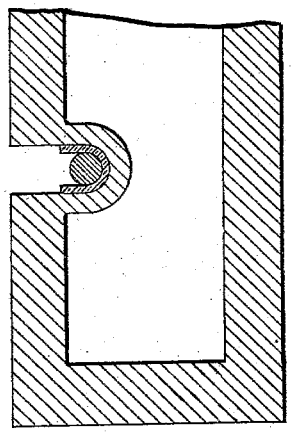
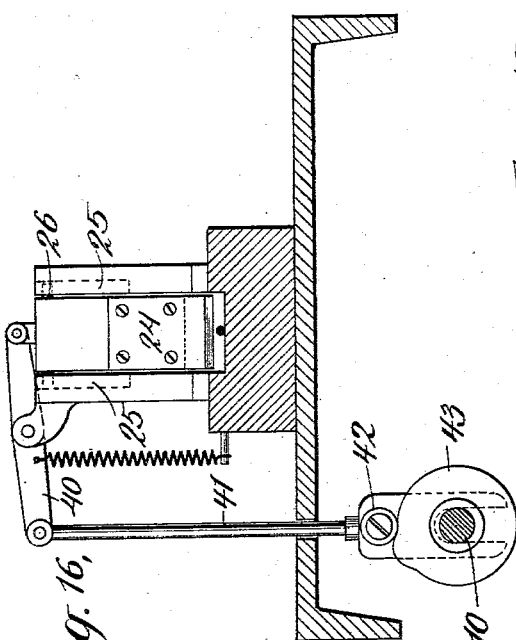
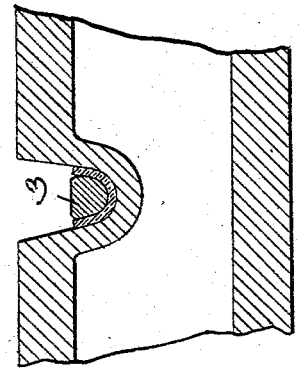
Witnesses
Inventor
D. Howard Haywood
By his Attorneys
Chapin Haywood & Marble No. 753,070.

Patented February 23, 1904.

UNITED STATES PATENT OFFICE.

DANIEL HOWARD HAYWOOD, OF NEW YORK, N. Y.

APPARATUS FOR MAKING HAIR-PINS.

SPECIFICATION forming part of Letters Patent No. 753,070, dated February 23, 1904.

Application filed April 23, 1903. Serial No. 153,891. (No model.)

*To all whom it may concern:*

Be it known that I, DANIEL HOWARD HAYWOOD, a citizen of the United States, residing in the city of New York, borough of Manhattan, county of New York, and State of New York, have invented a certain new and useful Apparatus for Making Hair-Pins, of which the following is a specification, reference being had to the accompanying drawings, forming a part thereof.

My invention relates generally to apparatus for covering wire with material—such, for example, as celluloid—which is capable of being shaped and molded by heat or pressure, or both heat and pressure combined. The machine herein described is adapted to cover sections or cores of wire or other suitable material with celluloid, rubber, and the like, and is particularly intended for use in making celluloid or rubber covered hair-pins having an inner stiffening-core of wire.

My invention consists in mechanism for forming a strip of rubber, celluloid, or other material capable of being shaped or molded in a machine into a tube, introducing a sectional core into this tube, uniting the tube with the core, and cutting the rod so formed into appropriate lengths and shaping the same into the form of hair-pins.

My invention also consists in various other features hereinafter set forth in the claims.

The objects of my invention are to facilitate and cheapen the production of hair-pins of the class described, to produce such pins by a continuous process without manipulation by hand, to improve mechanism for covering wire and the like with celluloid, rubber, or similar material, and to make the machine simple, relatively inexpensive, and substantially automatic in operation.

I will now proceed to describe my invention with reference to the accompanying drawings, in which one form of machine or apparatus embodying my invention is illustrated, and will then point out the novel features in claims.

In the said drawings, Figure 1, Sheet 1, and Fig. 2, Sheet 2, together form a continuous figure constituting a top view and partial horizontal longitudinal section of the said machine. Fig. 3, Sheet 1, and Fig. 4, Sheet 2, together form a continuous figure constituting a vertical longitudinal section of the said machine. Figs. 5, 6, 7, 8, 9, 10, and 11 are detail views of the celluloid strip, illustrating the various stages of forming the same into a tube and of wrapping the tube about the core and welding the edges of the strip together. Fig. 12 shows a detail vertical section of the wire-magazine. Fig. 13 shows a detail view of one of the sets of feeding and presser rolls. Fig. 14 shows a detail view of the pinching-rolls by which the pins are partially centered and are pointed. Fig. 15 shows a detail view of the bending ejecting mechanism. Fig. 16 shows a detail view of the cutting mechanism. Figs. 17, 18, and 19 are detail views of different portions of the former or die 3, by which the strip 4 is formed into a tube.

In the machine herein described the celluloid or other material from which the tube or cover is to be formed is fed into the machine in the form of a narrow strip or ribbon. By means of a suitable former or die the edges of this strip are turned upward until the section of the strip is substantially of U shape. At this point a wire or core is introduced, and by the further action of the said former or die the sides of the strip are turned over until they abut, thus completely inclosing the core. By the action of suitable heating, cementing, and pressing devices the cover thus formed is pressed firmly against the core and the abutting edges of the strip are welded together, the strip being then divided into appropriate lengths, (the ends of the pieces being pointed in so doing,) and then these lengths or pieces are bent into the form of hair-pins.

Referring first to Figs. 1 and 3, the portion of the machine there illustrated comprises a table 1, suitably supported and preferably provided with heating-coils 2 or the like, by which the table may be heated for the purpose of softening the celluloid or other material of which the cover is to be formed. Upon this table there is a former or die 3, adapted to turn upward the edges of the strip 4 of material from which the cover is to be formed. The construction of such formers or dies is well known. The strip 4 may be drawn from any suitable source—as, for example, a reel 5—and is guided to the former by means of rolls 6, which preferably are heating-rolls, as shown.

Upon the table 1 there is a magazine 7, adapted to contain short lengths of the core-wire. This magazine tapers toward the bottom, in which there is an orifice connecting with a passage 8, adapted to guide the wires as they issue from the magazine to a point directly over the partly-formed tube 4 at a point where such partly-formed tube has attained the form shown in Fig. 8. A sliding pusher 9, Fig. 12, reciprocated from the main driving-shaft 10 of the machine by means of a cam 11 thereon, a follower-lever 12, and a connecting-rod 13, pushes the wires one by one through the said passage 8 to the end thereof, permitting the wires to drop at such point into the partly-formed cover or tube. The pusher 9 closes the orifice of the magazine 7 except when it is in its extreme rearward position, so that but one wire can drop from said magazine at a time.

The cover-strip 4 is drawn through the former or die 3 by means of grooved feeding and pressing rolls 14, arranged in two pairs at right angles to each other, as shown particularly in Fig. 13, the rolls of each pair acting on opposite sides of the strip. They therefore not only feed the strip through the die, but press it against the core. Just before the strip has been formed into a complete tube cement is applied thereto by a pasting device comprising a reservoir 15 and pasting-rolls 16, 17, and 18, driven by suitable gearing from the driving-shaft 10. The effect of the pressure of the rolls 14 on the softened and cemented edges of the strip is to weld these edges together, and at the same time the strip is pressed against the core, so as to be firmly united therewith. The former or dies may or may not be heated, as desired. From the pressing-rollers 14 the rod thus formed passes through a heating-box 19 of any suitable length and between further grooved feeding and pressing rolls 14, between rollers 20, and thence through a cooling-box 21. In its passage through the heating-box 19 the material of the cover is further softened. The rollers 20, which may also be heating-rolls, are provided with projections or teeth 22, which pinch the material of the cover in the spaces intermediate the several sections of the core, so as almost, but not quite, to divide the rod into separate lengths. This pinching, however, draws the material of the cover down over the ends of the wire-cores, so as to produce the points of the pins. By the chilling action of suitable refrigerating material circulated through the cooling-box 21 by means of pipes 23 the plastic cover is hardened and set, the rod then passing on to a point opposite a reciprocating cutting-knife 24. This cutting-knife works up and down in guides 25 and is reciprocated by means of a cam on the driving-shaft 10 and suitable mechanism, hereinafter described. This knife, being pivoted at 26, may partake of the forward movement of the rod which it cuts during the cutting operation. The said knife divides the rod 4, formed in the preceding portion of the machine, into separate lengths, the cut always occurring at the notches formed by the rolls 20. The severed or partially-severed lengths are pushed forward opposite a bending-die 27, and as they successively come opposite this die the said die is moved transversely of the machine by mechanism shown in Fig. 15, bending the rods about the post 28, and so forming them into the shape of hair-pins. This die is reciprocated in suitable guides by means of a cam 29 on the driving-shaft, a follower-lever 30, and a link 31, and acts very rapidly, so that the forward motion of the main portion of the rod 4 is not interrupted. As soon as the pin is formed the die is retracted with equal rapidity by the spring 32, a bushing 33 surrounding the post 28 is raised by a cam 34 and follower-lever 35, so as to lift the formed hair-pin off from the post 28, and while this bushing is still in an elevated position a tilting table 36, upon which the main portion of the formed hair-pin rests, is tilted by means of a cam 37 (shown in dotted lines in Fig. 15) and a follower 38, thereby causing the pin to slide downward through a groove 39 to a point at which it may be received in any suitable receptacle.

The knife 24 is reciprocated by means of a lever 40, link 41, follower 42, and cam 43 on the main driving-shaft 10, as shown in Fig. 16.

The two sets of feeding and pressing rolls 14 are driven by means of spiral gearing from the main driving-shaft 10 and a parallel shaft 44, driven from shaft 10 by means of gearing 45, Fig. 13. The pinching-rollers 20 derive their motion from the shaft 10 by means of spiral gears, as shown in Fig. 14, as does the bending and ejecting mechanism. (Shown in Fig. 15.)

The bending mechanism (shown in Figs. 2 and 15) may be arranged to act at any desired angle, so that the seam in the cover may come at any desired point. It is obvious that various bending, feeding, pressing, and tube-forming mechanism may be used, and I do not limit myself to the use of any particular mechanisms for this purpose. It is obvious that the wire might be fed into the partly-formed tube continuously instead of in separate pieces spaced apart, and I do not limit myself to feeding in the wire in short lengths spaced apart, as herein illustrated and described.

Various forms of bending-dies may be used, so as to give the hair-pins any desired form or shape.

It will be obvious that the foregoing is but one embodiment of my invention and that the same is capable of many and varied modifications within the spirit and scope of my invention, and, further, that certain parts may be employed in connection with other parts of different construction. Hence I do not desire to be limited only to the precise detail of construction and combination of parts herein.

What I claim is—

1. In an apparatus for making hair-pins, the combination of a tube-forming die, wire-feeding mechanism, arranged to introduce a wire into the partly-formed tube, feeding and pressing mechanism adapted to feed a strip through said die and press the same about the wire, and means for heating the strip prior to its introduction into the said pressing mechanism.

2. In an apparatus for making hair-pins, the combination of a tube-forming die, wire-feeding mechanism, arranged to introduce a wire into the partly-formed tube, feeding and pressing mechanism adapted to feed a strip through said die and press the same about the wire, means for severing the rod so formed into lengths, and bending mechanism arranged to bend the same into hair-pin form.

3. In an apparatus for making hair-pins, the combination of a tube-forming die, wire-feeding mechanism, arranged to introduce a wire into the partly-formed tube, feeding and pressing mechanism adapted to feed a strip through said die and press the same about the wire, means for heating the strip, means for severing the rod so formed into lengths, and bending mechanism.

4. In an apparatus for making hair-pins, the combination of a tube-forming die, wire-feeding mechanism, arranged to introduce a wire into the partly-formed tube, feeding and pressing mechanism adapted to feed a strip through said die and press the same about the wire, means for heating the strip, a pasting device, means for severing the rod so formed into lengths, and bending mechanism.

5. In an apparatus for making hair-pins, the combination of a tube-forming die, wire-feeding mechanism, arranged to introduce a wire into the partly-formed tube, feeding and pressing mechanism adapted to feed a strip through said die and press the same about the wire, and pinching mechanism, for dividing the rod so formed into lengths and for tapering the ends of such lengths.

6. In an apparatus for making hair-pins, the combination of a tube-forming die, wire-feeding mechanism, arranged to introduce a wire into the partly-formed tube, feeding and pressing mechanism adapted to feed a strip through said die and press the same about the wire, pinching mechanism, for dividing the rod so formed into lengths and for tapering the ends of such lengths, cutting mechanism, and bending mechanism.

7. In an apparatus for making hair-pins, the combination of a tube-forming die, wire-feeding mechanism, arranged to introduce a wire into the partly-formed tube, feeding and pressing mechanism adapted to feed a strip through said die and press the same about the wire, means for heating the strip, pinching mechanism, for dividing the rod so formed into lengths and for tapering the ends of such lengths, and cutting mechanism.

8. In an apparatus for making hair-pins, the combination of a tube-forming die, wire-feeding mechanism, arranged to introduce a wire into the partly-formed tube, feeding and pressing mechanism adapted to feed a strip through said die and press the same about the wire, means for heating the strip, pinching mechanism, for dividing the rod so formed into lengths and for tapering the ends of such lengths, cutting mechanism, and bending mechanism.

9. In an apparatus for making hair-pins, the combination of a tube-forming die, wire-feeding mechanism, arranged to introduce a wire into the partly-formed tube, feeding and pressing mechanism adapted to feed a strip through said die and press the same about the wire, means for heating the rod so formed, pinching mechanism, for dividing the wire so formed into lengths and for tapering the ends of such lengths, and cutting mechanism.

10. In an apparatus for making hair-pins, the combination of a tube-forming die, wire-feeding mechanism, arranged to introduce a wire into the partly-formed tube, feeding and pressing mechanism adapted to feed a strip through said die and press the same about the wire, means for heating the rod so formed, pinching mechanism, for dividing the wire so formed into lengths and for tapering the ends of such lengths, cutting mechanism, and bending mechanism.

11. In an apparatus for making hair-pins, the combination of a tube-forming die, wire-feeding mechanism arranged to introduce a wire into the partly-formed tube, means for rendering plastic the material wrapped about such wire, and feeding and pressing mechanism adapted to feed a strip through said die and press the same against the wire, comprising grooved presser-rollers having projections arranged to pinch, but not sever, the plastic material at intervals.

12. In an apparatus of the class described, the combination of a tube-forming die, wire-feeding mechanism, arranged to introduce a wire into the partly-formed tube, means for heating the material wrapped about such wire, feeding and pressing mechanism adapted to feed a strip through said die and press the same against the wire, comprising grooved presser-rollers having projections arranged to pinch, but not sever, the plastic material at intervals, and means for hardening the said material.

13. In an apparatus of the class described, the combination of a tube-forming die, wire-feeding mechanism, arranged to introduce a wire into the partly-formed tube, means for heating the material wrapped about such wire, feeding and pressing mechanism adapted to feed a strip through said die and press the same against the wire, comprising grooved presser-rollers having projections arranged to pinch, but not sever, the plastic material at intervals, means for hardening the said material, and cutting mechanism.

14. In an apparatus of the class described, the combination of a tube-forming die, wire-feeding mechanism, arranged to introduce a wire into the partly-formed tube, means for heating the material wrapped about such wire, feeding and pressing mechanism adapted to feed a strip through said die and press the same against the wire, comprising grooved presser-rollers having projections arranged to pinch, but not sever, the plastic material at intervals, means for hardening the said material, and cutting and bending mechanism.

15. In an apparatus for making hair-pins, the combination with means for wrapping a covering-strip around a core of wire, of means for feeding wire thereto at spaced intervals, and means for swaging or drawing out the covering over the ends of the wire.

16. In an apparatus for making hair-pins, the combination with means for wrapping a covering-strip around a core of wire, of means for feeding wire thereto at spaced intervals, pressing mechanism for pressing the cover, and means for swaging or drawing out the covering over the ends of the wire.

17. In an apparatus of the class described, the combination with means for wrapping a covering-strip around a core of wire, of means for feeding wire thereto at spaced intervals, pressing mechanism for pressing the cover, and means for rendering said cover plastic.

18. In an apparatus of the class described, the combination with means for wrapping a covering-strip around a core of wire, of means for feeding wire thereto at spaced intervals, means for swaging or drawing out the covering over the ends of the wire, pressing mechanism for pressing the cover, and cutting mechanism for cutting the cover between the sections of wire.

19. In an apparatus of the class described, the combination with means for wrapping a covering-strip around a core of wire, of means for feeding wire thereto at spaced intervals, and pinching mechanism arranged to swage or draw out the covering over the ends of the wire.

20. In an apparatus of the class described, the combination with means for wrapping a covering-strip around a core of wire, of means for feeding wire thereto at spaced intervals, pinching mechanism arranged to swage or draw out the covering over the ends of the wire, and cutting mechanism.

21. In an apparatus of the class described the combination with means for wrapping a covering-strip around a core of wire, of means for feeding wire thereto at spaced intervals, pinching mechanism for pinching the cover between the sections of wire, and means for rendering the cover plastic.

22. In an apparatus of the class described, the combination with a magazine adapted to contain core-wires, and means for feeding wires therefrom at intervals, of means for wrapping a covering-strip around said wires.

23. In an apparatus of the class described, the combination of a tube-forming die, wire-feeding mechanism, arranged to introduce a wire into the partly-formed tube, feeding and pressing mechanism adapted to feed a strip through said die and press the same about the wire, and means for rendering the strip or cover plastic.

24. In an apparatus for making hair-pins, the combination of a tube-forming die, wire-feeding mechanism, arranged to introduce a wire into the partly-formed tube, feeding and pressing mechanism adapted to feed a strip through said die and press the same about the wire, means for rendering the strip or cover plastic, means for severing the rod so formed into lengths, and bending mechanism.

25. In an apparatus for making hair-pins, the combination of a tube-forming die, wire-feeding mechanism, arranged to introduce a wire into the partly-formed tube, feeding and pressing mechanism adapted to feed a strip through said die and press the same about the wire, means for rendering the cover plastic, and pinching mechanism, for dividing the rod so formed into lengths and for tapering the ends of such lengths.

26. In an apparatus for making hair-pins, the combination of wire-feeding mechanism, wrapping mechanism for wrapping a covering-strip around said wire, means for rendering said cover plastic, and pointing mechanism for dividing the rod so formed into lengths and pointing the lengths.

27. In an apparatus for making hair-pins, the combination of wire-feeding mechanism, wrapping mechanism for wrapping a covering-strip around said wire, means for rendering said cover plastic, pointing mechanism for dividing the rod so formed into lengths and pointing the lengths, and cutting mechanism.

28. In an apparatus for making hair-pins, the combination of wire-feeding mechanism, wrapping mechanism for wrapping a covering-strip around said wire, means for rendering said cover plastic, pointing mechanism for dividing the rod so formed into lengths and pointing the lengths, and cutting and bending mechanisms.

29. In an apparatus for making hair-pins, the combination of wire-feeding mechanism, means for wrapping a covering-strip around said wire, means for rendering said cover plastic, means for pressing said cover about the wire, and means for dividing the rod so formed into lengths.

30. In an apparatus of the class described, the combination of a former or die adapted to form a flexible strip into a tube having a longitudinal seam, of means for feeding a core into such tube, and feeding and pressing mechanism for the strip comprising pairs of oppositely-arranged grooved rolls set at different angles, each pair acting upon the tube at an angle with respect to the seam thereof.

In testimony whereof I affix my signature in the presence of two witnesses.

DANIEL HOWARD HAYWOOD.

Witnesses:
 C. F. CARRINGTON,
 MINERVA PAPE.